United States Patent [19]
Rau et al.

[11] 3,837,839
[45] Sept. 24, 1974

[54] METHOD OF PREPARING IRON POWDER SUITABLE FOR MAGNETIC RECORDING

[75] Inventors: Hans Rau, Laurensberg; Joachim Rolf Wegener, Oberforstbach, both of Germany; Peter Townsend Greene, Emmasingel, Netherlands

[73] Assignee: U.S. Philips Corporation, New York, N.Y.

[22] Filed: Feb. 26, 1973

[21] Appl. No.: 335,908

[30] Foreign Application Priority Data

Mar. 17, 1972 Germany ........................... 2212933

[52] U.S. Cl. .............................. 75/.5 AA, 75/.5 BA
[51] Int. Cl. .............................................. C22b 5/12
[58] Field of Search ........................ 75/.5 AA, .5 BA

[56] References Cited

UNITED STATES PATENTS

| | | | |
|---|---|---|---|
| 3,598,568 | 8/1971 | Klomp et al. | 75/.5 AA |
| 3,607,220 | 9/1971 | van der Giessen et al. | 75/.5 AA |
| 3,623,859 | 11/1971 | Aldridge | 75/.5 AA |
| 3,627,509 | 12/1971 | van der Giessen et al. | 75/.5 BA X |
| 3,702,270 | 11/1972 | Kawasaki et al. | 75/.5 AA X |

*Primary Examiner*—L. Dewayne Rutledge
*Assistant Examiner*—Arthur J. Steiner
*Attorney, Agent, or Firm*—Frank R. Trifari; Carl P. Steinhauser

[57] ABSTRACT

A method of preparing a metal powder which consists mainly of iron by reduction of finely divided acicular iron oxide hydrate. The iron oxide hydrate particles are doped with a metal which is catalytic for hydrogen reactions (for example Co, Ni, Ru). The reduction to metal then occurs more rapidly.

3 Claims, 2 Drawing Figures

METHOD OF PREPARING IRON POWDER SUITABLE FOR MAGNETIC RECORDING

The invention relates to a method of preparing a metal powder which mainly consists of iron by reduction of finely divided acicular iron oxide hydrate with a gaseous reduction agent.

Such a method is known from British Pat. specification 743,792 in which the reduction occurs in the presence of cobalt or nickel. Powdered iron oxide, preferably in hydrated form, is mixed with an organic nickel salt or organic cobalt salt, which salts are decomposable at temperatures between 300°C and 425°C. The mixture is heated for 2 or 3 hours in a reducing atmosphere at a temperature between 300°C and 425°C. This reduction time is sufficient and is shorter than the time necessary for the reduction in the absence of nickel and/or cobalt, which under equal circumstances is at least 4 hours.

A short reduction time is important in preparing finely divided powders because otherwise an undesirable sintering takes place. It has been found that a considerable shortening of the reduction time can be achieved if a special iron oxide hydrate is used.

According to the invention, the iron oxide hydrate particles are doped with at least 0.3 percent of at least one metal which is catalytic for hydrogen reactions and the reduction takes place at a temperature below 350°C. As metals which are catalytic for hydrogen reactions are mentioned inter alia Ni, Co, Ru, Pt and Pd. Due to the fact that the iron oxide hydrate particles are acicular, the upper limit of the doping is determined. The resulting powders show properties (coercive force, rectangularity of the hysteresis loop) which make them suitable for magnetic recordings. The reduction process occurs at temperatures below 350°C and often even considerably lower than 350°C at a rate suitable for practical purposes. The iron oxide hydrate particles are in particular doped at least with Ni and/or Co.

It is to be noted that it is known per se to prepare cobalt-doped $\gamma$-$Fe_2O_3$ particles for magnetic recording in which cobalt-doped FeOOH particles are reduced to $Fe_3O_4$ and then oxidized to $\gamma$-$Fe_2O_3$. The object of the cobalt doping is a variation of the magnetic properties of the oxide particles and it has no essential influence on the rate of the reduction to $Fe_3O_4$.

Figure 1:
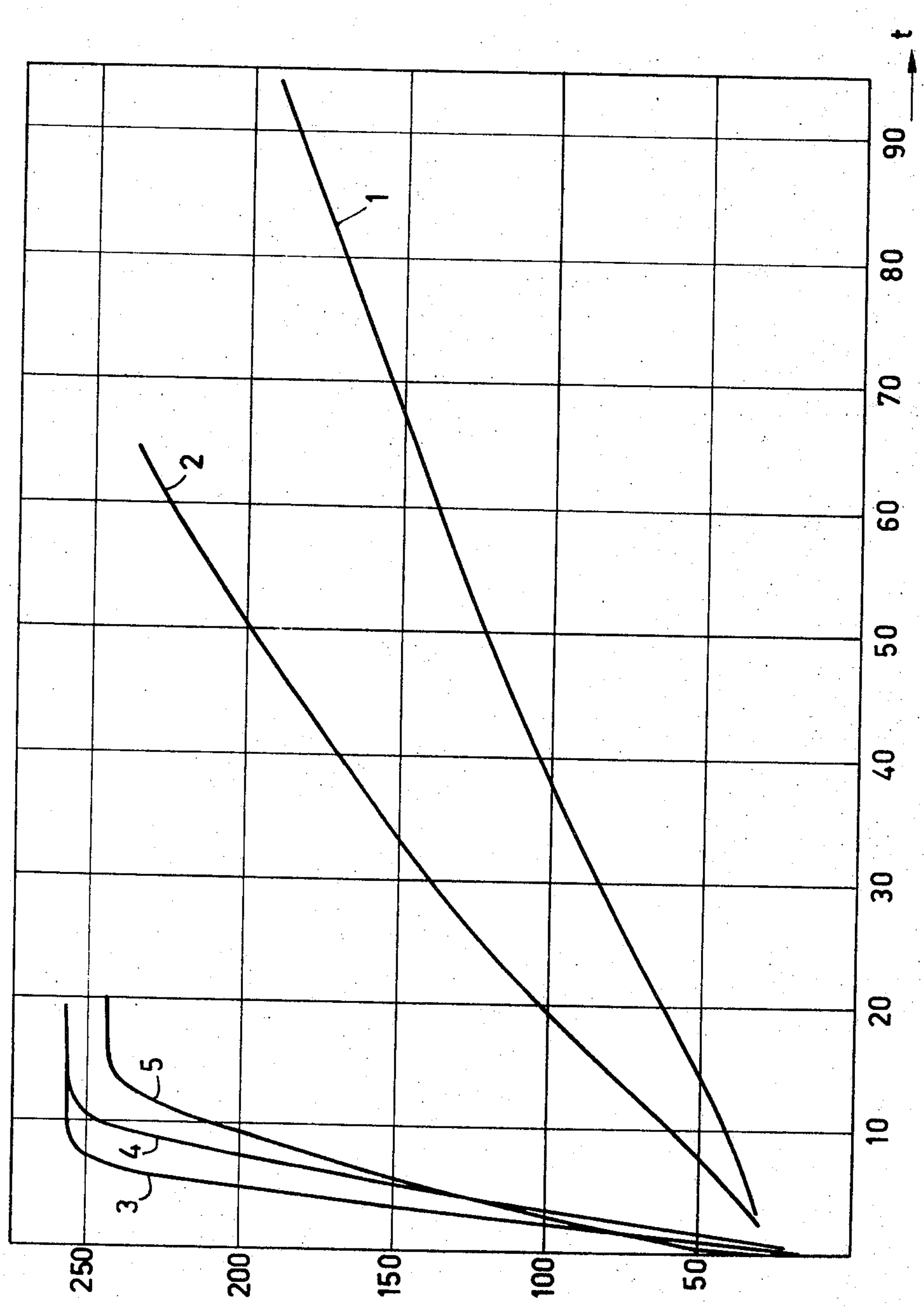
Figure 2:
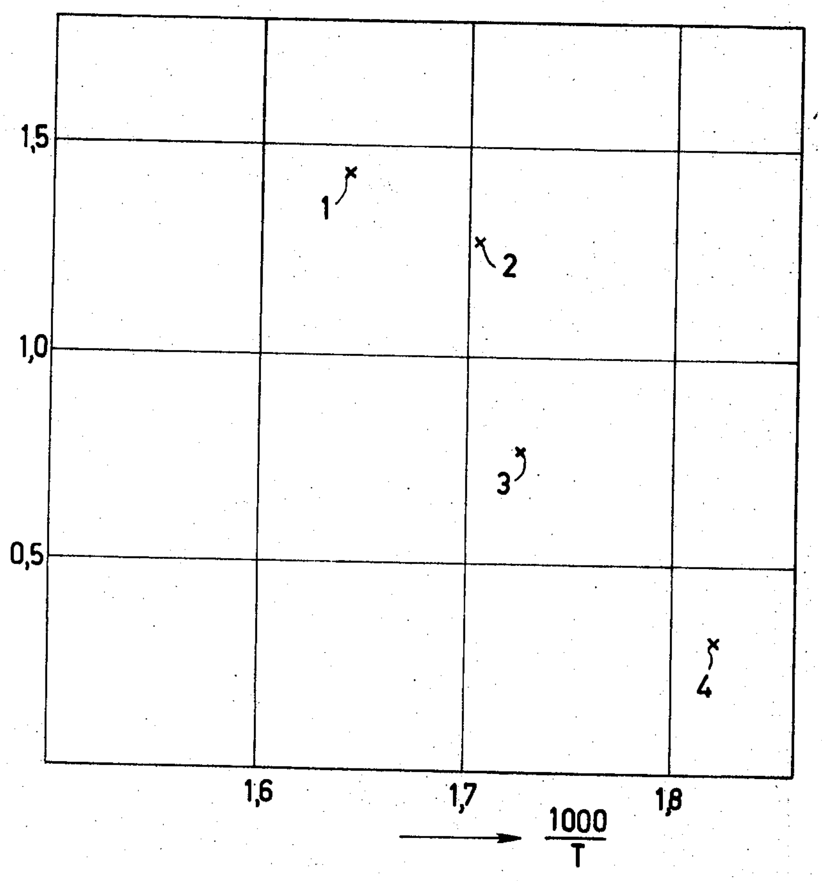

The invention will now be described in greater detail with reference to a few examples. FIG. 1 shows the decrease in weight as a function of the reduction time and FIG. 2 shows the reduction rate as a function of the reduction temperature.

Example 1.

5–10 gram of two different $\alpha$-FeOOH powders which were doped with 1 at. percent of Sn and which consisted of acicular particles having a length of approximately 0.2 $\mu$m and a thickness of approximately 0.02 $\mu$m, which are powders not according to the invention, were reduced. They were exposed in a rotating tubular furnace of quartz at 310°C for 75 minutes to a dry hydrogen stream of 460 litres per hour and then slowly passivated at room temperature with a nitrogen-oxygen mixture. The resulting powders were only partly reduced to iron and showed the following magnetic properties.

| | $\iota_s \times 10^4$ | $\iota_r/\iota_s$ | $H_c$ | $H_r$ | $H_c/H_r$ |
|---|---|---|---|---|---|
| Powder I | 0.98 | 0.41 | 525 | 1100 | 0.48 |
| Powder II | 1.40 | 0.45 | 885 | 1250 | 0.71 |

The saturation magnetisation $\iota_s$ and the remanence $\iota_r$ are expressed in Wbm/kg and $H_c$ and $H_r$ in Oersted.

Example 2.

To a solution of 10 kg $FeSO_4.7H_2O$ and 303.5 g $CoSO_4.7H_2O$ in 70 litres of deionised water, which solution furthermore contained 55 ml of $H_2SO_4$ (specific gravity 1.84) was added a solution of 17 kg of NaOH in 64 litres of deionized water, a precipitate of mixed hydroxides of iron and cobalt being formed. Approximately 40 litres of air per minute were then introduced, the precipitate being oxidized; after 24 hours the reaction was completed. The product, cobalt-doped FeOOH, was filtered off, washed with water and dried at 80°C.

To a solution of 417 g of $FeSO_4.7H_2O$ and 13 g of $Ni(NO_3)_2.6H_2O$ in 5.7 litres of deionized water, which solution furthermore contained 15 ml of $H_2SO_4$ (specific gravity 1.84) were added a solution of 920 g of NaOH in 2.3 l of deionized water and furthermore an alkaline $Sn^{2\pm}$ solution which contained 3.2 g of $SnCl_2.2H_2O$, a precipitate of mixed hydroxides of iron, nickel and tin being formed. Subsequently, approximately 25 l of air per minute were introduced, the precipitate being oxidized; after approximately 16 hours the reaction was completed. The product, FeOOH doped with nickel and tin, was filtered off, washed with water and dried at 80°C.

To 12 ml of $H_2SO_4$ (specific gravity 1.18) was added so much deionized water that a volume of 1.2 l was obtained. 84 gr of $FeSO_4.7H_2O$ and furthermore 2.37 g of $RuCl_3.xH_2O$ were dissolved in said liquid. A solution of 0.68 g of $SnCl_2.2H_2O$ and 228 g of NaOH in 800 ml of deionized water were added to the solution, a precipitate of mixed hydroxides of iron, ruthenium and tin being formed. Subsequently, approximately 6 l of air per minute were introduced, the precipitate being oxidized; after 24 hours the reaction was completed. The product, FeOOH doped with ruthenium and tin, was filtered off, washed with water and dried at 80°C.

The powders were reduced in the manner described in Example 1. The resulting powders showed the following magnetic properties.

| | $\iota_s \times 10^4$ | $\iota_r/\iota_s$ | $H_c$ | $H_r$ | $H_c/H_r$ |
|---|---|---|---|---|---|
| doped with 3 At.% Co | 2.31 | 0.605 | 820 | 1080 | 0.76 |
| doped with 3 At.% Ni and 1 At.% Sn | 2.10 | 0.41 | 978 | 1287 | 0.76 |
| doped with 3 At.% Ru and 1 At.% Sn | 1.75 | 0.33 | 990 | 1510 | 0.67 |

The powders had particle dimensions similar to those of Example 1 and therefore the results of the Examples 1 and 2 may be compared. Since the saturation magnetisation $\iota_s$ in Example 2 is higher than in Example 1 it can be concluded there is a considerably higher content of metallic iron in the powders. The powders doped with Ni and Co were substantially entirely reduced, while the reduction in the case of ruthenium was not yet entirely completed.

Example 3.

In order to more clearly demonstrate the differences in the reduction rates, experiments were performed on the thermo-balance. Each time 1 g of the oxide hydrate powders described in the above Examples was disposed in a holder of corrosion free steel fabric. The gas could pass through the walls of the holder and reach the powder from all sides. The holder suspending from the balance was heated in a furnace with an adapted program. First the weight in air was recorded. Then, after evacuation, a new weight was achieved by evaporation of adsorbed water. The quantity of water generally is approximately 1.5–2 percent by weight. The powder was then rapidly brought in high vacuum at approximately 200°C and then at the reduction temperature (usually 277° ± 7°C) in 1 to 2 hours. At this temperature, a constant weight was achieved after approximately one hour which corresponds to $Fe_2O_3$. The powder remained unvaried even after a stay of the powder of more than 20 hours under the same conditions The reduction gas, hydrogen, was supplied without variation of the temperature. The rate of the gas measured at room temperature was always 5 l per hour. The reduction was usually carried out completely.

The results of the experiments on the thermobalance are shown in FIG. 1. The reduction time in hours is plotted on the horizontal axis. The zero point lies with the supply of the hydrogen. The decrease in weight in mgm is plotted on the vertical axis. The zero point lies at the weight of the powder after dehydration and prior to the supply of the hydrogen; so the zero point corresponds to the weight of the $Fe_2O_3$ preferably doped with nickel, cobalt or ruthenium. Starting material in the experiments was always 1 g. During dehydration the weight decreased by approximately 130 – 150 milligram so that 850–870 milligram of the $Fe_2O_3$ preferably doped with nickel, cobalt or ruthenium remained. The difference in weight at the zero point is to be ascribed inter alia to the presence of nickel, cobalt or ruthenium. In each case the $Fe_2O_3$ was reduced to $Fe_3O_4$ in a rather short period of time, while for the further reduction to Fe different times were necessary. The curves in FIG. 1 begin at approximately the composition $Fe_3O_4$.

In FIG. 1, curve 1 relates to the FeOOH-powder I doped with 1 percent Sn, curve 2 relates to the FeOOH-powder II doped with 1 percent Sn, curve 3 relates to FeOOH-powder doped with 3 percent Ni and 1 percent Sn, curve 4 relates to the FeOOH-powder doped with 3 percent Co and curve 5 relates to the FeOOH-powder doped with 3 percent Ru and 1 percent Sn.

In the cases in which a reduction was completely carried out, no variation of the weight occurred, which appears from the horizontal parts of the curves. The horizontal parts lie at different weight decreases because the oxygen content of the powders at the zero points adjusted during the experiments was different.

Example 4.

In order to illustrate the dependence of the reduction rate on the reduction temperature for the method not in accordance with the invention, four equal powders were reduced to iron according to the method of Example 1 and that at different temperatures, namely 336°C, 313°C, 306°C and 276°C. FIG. 2 shows in the horizontal direction $1000/T$, where $T$ is the reduction temperature in ° Kelvin and in the vertical direction the logarithm of the reduction rate. Reduction rate is to be understood to mean the decrease in weight per hour in the rectilinear part of the relevant measuring curves. Point 1 relates to 336°C, point 2 to 313°C, point 3 to 306°C, and point 4 to 276°C.

What is claimed is:

1. A method of preparing an iron powder suitable for magnetic recording comprising the steps of co-precipitating from a solution containing an iron salt and a salt of a metal selected from the group consisting of Ni, Co, Ru, Pt and Pd acicular particles of an iron oxide hydrate doped with one of said metals, and reducing said doped iron oxide hydrate at a temperature below 350°C.

2. A method as claimed in claim 1, wherein the iron oxide hydrate particles are doped with Ni.

3. A method as claimed in claim 1 wherein the iron oxide hydrate particles are doped with Co.

* * * * *